(12) United States Patent
Kamiya et al.

(10) Patent No.: US 8,217,547 B2
(45) Date of Patent: Jul. 10, 2012

(54) ROTATING ELECTRIC MACHINE

(75) Inventors: Munehiro Kamiya, Toyota (JP);
Shigenori Yoneda, Ohbu (JP); Hiroshi Kaneiwa, Chiryu (JP); Hiroyuki Ikuta, Kariya (JP); Yasuhide Yagyu, Aichi-gun (JP); Tomofumi Morishita, Miki (JP)

(73) Assignees: Toyota Jidosha Kabushiki Kaisha, Aichi-ken (JP); Denso Corporation, Aichi-ken (JP)

( * ) Notice: Subject to any disclaimer, the term of this patent is extended or adjusted under 35 U.S.C. 154(b) by 323 days.

(21) Appl. No.: 12/611,649

(22) Filed: Nov. 3, 2009

(65) Prior Publication Data
US 2010/0117465 A1    May 13, 2010

(30) Foreign Application Priority Data
Nov. 7, 2008   (JP) ................. 2008-286856

(51) Int. Cl.
*H02K 1/12* (2006.01)
*H02K 5/24* (2006.01)
*H02K 1/27* (2006.01)

(52) U.S. Cl. ............... 310/156.56; 310/216.074
(58) Field of Classification Search ............. 310/156.55, 310/156.56, 156.57, 156.58, 216.074
See application file for complete search history.

(56) References Cited

U.S. PATENT DOCUMENTS

| | | | |
|---|---|---|---|
| 710,425 A | 10/1902 | Churchward | |
| 5,047,681 A * | 9/1991 | Gaillard et al. | 310/156.55 |
| 5,844,346 A | 12/1998 | Kolomeitsev et al. | |
| 7,151,335 B2 * | 12/2006 | Tajima et al. | 310/156.48 |
| 7,550,891 B2 * | 6/2009 | Kim | 310/216.092 |
| 2009/0243423 A1 | 10/2009 | Hattori | |

FOREIGN PATENT DOCUMENTS

| | | |
|---|---|---|
| DE | 60022973 T2 | 7/2006 |
| EP | 1 109 285 B1 | 12/2000 |
| GB | 2 260 860 A | 4/1993 |
| GB | 2 289 575 A | 11/1995 |
| GB | 2 312 336 A | 1/1997 |
| JP | 61221559 A | 10/1986 |
| JP | 2001-161048 A | 6/2001 |
| JP | 2003088027 A | 3/2003 |
| JP | 2006-149167 A | 6/2006 |
| JP | 2006-174651 A | 6/2006 |
| JP | 2007-135330 A | 5/2007 |
| JP | 2007166710 A | 6/2007 |
| JP | 2007295712 A | 11/2007 |
| JP | 2008160939 A | 7/2008 |
| WO | 2007-066829 A1 * | 6/2007 |

OTHER PUBLICATIONS

German Office Action for Corresponding Application No. 102009046399.2 dated Feb. 16, 2011.

* cited by examiner

*Primary Examiner* — Burton Mullins
(74) *Attorney, Agent, or Firm* — Sughrue Mion, PLLC

(57) ABSTRACT

In a rotating electric machine, a path length between a rotor and an inter-hetero-phase tooth where a magnetic flux from a magnetic pole proceeds from the rotor and starts to enter the inter-hetero-phase tooth is longer than a path length between the rotor and an inter-V-phase tooth where the magnetic flux proceeds from the rotor and starts to enter the inter-V-phase tooth.

7 Claims, 16 Drawing Sheets

ROTATING ELECTRIC MACHINE

This nonprovisional application is based on Japanese Patent Application No. 2008-286856 filed on Nov. 7, 2008 with the Japan Patent Office, the entire contents of which are hereby incorporated by reference.

BACKGROUND OF THE INVENTION

1. Field of the Invention

The present invention relates to a rotating electric machine, and particularly to a rotating electric machine having a multiphase coil including a plurality of phase coils.

2. Description of the Background Art

Various types of rotating electric machines, stators and the like with reduced vibrations for example have been proposed. Japanese Patent Laying-Open No. 2001-161048 for example discloses a rotating electric machine including a plurality of split cores and coils wound around winding mount portions formed at the split cores.

Stator teeth are formed at the split cores and each stator tooth has a flange formed at the top of the stator tooth. Japanese Patent Laying-Open No. 2007-135330 discloses a stator having a split core with a flange and a split core without flange that are alternately arranged.

Japanese Patent Laying-Open No. 2006-174651 discloses a stator including a plurality of split cores. Each split core includes a yoke element, a main portion formed at the center of the yoke element, and wing portions formed respectively on the right side and the left side of the main portion. The main portion and the right and left wing portions form a magnetic pole face.

Japanese Patent Laying-Open No. 2006-149167 discloses a stator including a plurality of stator teeth, and a rotating electric machine. At a circumferentially central portion of the top face of each stator tooth, an auxiliary groove extending in the axial direction is formed.

In the above-referenced conventional rotating electric machines each, a multiphase coil is wound around stator teeth. The multiphase coil includes U-phase, V-phase and W-phase coils, and alternating currents with different phases are supplied to respective phase coils.

The stator teeth include an inter-hetero-phase tooth, namely a tooth located between adjacent slots in which respective phase coils of different phases are inserted, and an inter-homo-phase tooth, namely a tooth located between adjacent slots in which respective phase coils of the same phase are inserted. In such a rotating electric machine, a magnetic flux is generated from each phase coil when alternating current is supplied to the phase coil. At this time, the state of flow of the magnetic flux formed by each phase coil in the inter-hetero-phase tooth and the state of flow of the magnetic flux in the inter-homo-phase tooth considerably differ from each other.

Further, the reluctance of a magnetic circuit when a magnetic flux from a magnet or the like provided in a rotor proceeds from the surface of the rotor and enters the inter-hetero-phase tooth is smaller than the reluctance of the magnetic circuit when the magnetic flux proceeds from the surface of the rotor and passes in the inter-homo-phase tooth.

Therefore, when the rotor rotates and the magnetic flux from the magnet enters the inter-hetero-phase tooth, the torque applied to the rotor suddenly increases, which is likely to cause vibrations and noise to the rotating electric machine.

SUMMARY OF THE INVENTION

The present invention has been made in view of the problems as described above, and an object of the invention is to provide a rotating electric machine with reduced vibrations and noise.

A rotating electric machine according to the present invention includes a stator having an annularly-shaped stator core and a multiphase coil attached to the stator core and including a plurality of phase coils supplied with alternating currents of different phases respectively, and a rotor inserted in the stator and having a plurality of magnetic poles.

The stator core includes a yoke extending in a circumferential direction of the stator core, a plurality of stator teeth formed on a peripheral surface of the yoke and spaced from each other in the circumferential direction, and a plurality of slots defined between the stator teeth, and the phase coils are inserted in the slots. Further, the stator teeth include an inter-homo-phase tooth laterally sandwiched between two of the slots in which the phase coils of the same phase are inserted respectively, and an inter-hetero-phase tooth laterally sandwiched between two of the slots in which the phase coils of different phases are inserted respectively. A magnetic flux path length between the rotor and the inter-hetero-phase tooth where a magnetic flux from the magnetic pole proceeds from the rotor and starts to enter the inter-hetero-phase tooth is longer than a magnetic flux path length between the rotor and the inter-homo-phase tooth where the magnetic flux proceeds from the rotor and starts to enter the inter-homo-phase tooth.

Preferably, the inter-hetero-phase tooth includes an inter-hetero-phase tooth body defined by a pair of sides located laterally in the circumferential direction of the stator core, and an inter-hetero-phase tooth head located radially inward of the stator core with respect to the inter-hetero-phase tooth body and extending continuously from the inter-hetero-phase tooth body. The inter-hetero-phase tooth head includes at least one of a first receding portion extending continuously from one side of the pair of sides of the inter-hetero-phase tooth body and, toward radially inner side, extending away from a first imaginary side axis line and approaching a second imaginary side axis line, and a second receding portion extending continuously from the other side of the pair of sides of the inter-hetero-phase tooth body and, toward radially inner side, extending away from the second imaginary side axis line and approaching the first imaginary side axis line, where the first imaginary side axis line is an imaginary axis line extending along the one side of the pair of sides of the inter-hetero-phase tooth, and the second imaginary side axis line is an imaginary axis line extending along the other side of the pair of sides of the inter-hetero-phase tooth.

Preferably, the inter-hetero-phase tooth includes the first receding portion and the second receding portion, the inter-homo-phase tooth includes an inter-homo-phase tooth body defined by a pair of sides located laterally in the circumferential direction of the stator core, and an inter-homo-phase tooth head located radially inward of the stator core with respect to the inter-homo-phase tooth body and extending continuously from the inter-homo-phase tooth body. Further, the inter-homo-phase tooth head includes a third receding portion extending continuously from one side of the pair of sides of the inter-homo-phase tooth body and, toward radially inner side, extending away from a third imaginary side axis line and approaching a fourth imaginary side axis line, and a fourth receding portion extending continuously from the other side of the pair of sides of the inter-homo-phase tooth body and, toward radially inner side, extending away from the fourth imaginary side axis line and approaching the third imaginary side axis line, where the third imaginary side axis line is an imaginary axis line extending along the one side of the pair of sides of the inter-homo-phase tooth, and the fourth imaginary side axis line is an imaginary axis line extending along the other side of the pair of sides of the inter-homo-phase tooth. The first receding portion is located radially outward with respect to the third receding portion, and the second receding portion is located radially outward with respect to the fourth receding portion.

Preferably, the inter-hetero-phase tooth includes a first end face located radially inward of the inter-hetero-phase tooth head, and the inter-homo-phase tooth includes a second end face located radially inward of the inter-homo-phase tooth head. Further, a smaller one of cross angles defined by the first end face and the first receding portion is smaller than a smaller one of cross angles defined by the second end face and the third receding portion. Preferably, a smaller one of cross angles defined by the first end face and the second receding portion is smaller than a smaller one of cross angles defined by the second end face and the fourth receding portion.

Preferably, the inter-hetero-phase tooth includes a body defined by a pair of sides located laterally in the circumferential direction of the stator core, and a head located radially inward of the stator core with respect to the body and extending continuously from the body. The head is located on an imaginary radial axis line side relative to an imaginary intersection of an imaginary side axis line and an imaginary end face axis line, where the imaginary side axis line is an imaginary axis line extending along one side of the pair of sides of the inter-hetero-phase tooth, the imaginary radial axis line is an imaginary axis line crossing an end face located radially inward of the inter-hetero-phase tooth and extending in radial direction of the stator, and the imaginary end face axis line is an imaginary axis line extending along the end face and extending perpendicularly to the imaginary radial axis line.

Preferably, respective corners between an end face located radially inward of the inter-hetero-phase tooth and respective sides of the inter-hetero-phase tooth that are located laterally in the circumferential direction of the stator core is located further away from the rotor relative to respective corners between an end face located radially inward of the inter-homo-phase tooth and respective sides of the inter-homo-phase tooth that are located laterally in the circumferential direction of the stator core.

Preferably, the stator teeth are tapered from a bottom on the yoke side toward an end face located radially inward.

Preferably, the multiphase coil is s-slot distributed coil distributed among s (s is greater than zero: a positive number) slots, and the number of the inter-homo-phase teeth located between the inter-hetero-phase teeth is (s–1).

With the rotating electric machine of the present invention, vibrations and noise can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A rotating electric machine according to embodiments of the present invention will be described with reference to FIGS. 1 to 18.

It should be noted that, where any number, quantity or the like is referred to in the embodiments described below, the scope of the present invention is not necessarily limited to the number, quantity or the like unless otherwise specified. Further, each element in the following embodiments is not necessarily requisite for the present invention unless otherwise specified. Furthermore, where a plurality of embodiments are given below, it is originally intended that respective features of the embodiments may be combined as appropriate.

First Embodiment

Figure 1:
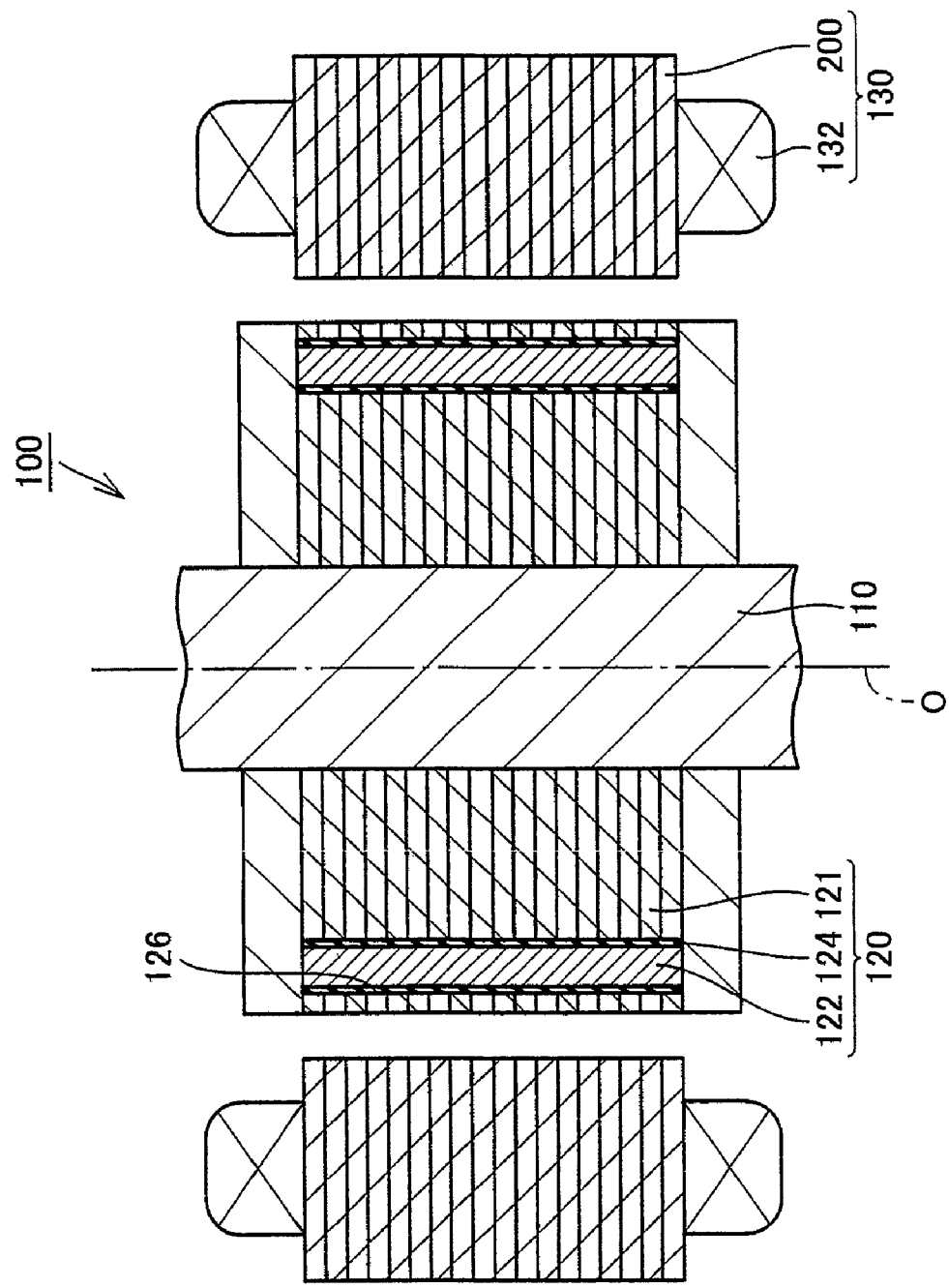
FIG. 1 is a side cross-sectional view of a rotating electric machine according to the present invention.

FIG. 1 is a side cross-sectional view of a rotating electric machine according to the present invention. As shown in FIG. 1, rotating electric machine 100 includes an annularly-shaped stator 130, a rotational shaft 110 inserted in stator 130 and provided rotatably about a rotational central line O, and a rotor 120 secured to rotational shaft 110 and provided rotatably about rotational central line O.

Rotor 120 includes a rotor core 121 formed by stacking a plurality of electromagnetic steel plates, and a plurality of permanent magnets 122 attached to rotor core 121.

In the vicinity of the outer peripheral edge of rotor core 121, a plurality of magnet insert holes 126 extending in the direction of rotational central line O are circumferentially spaced from each other. Permanent magnet 122 is inserted in magnet insert hole 126 and secured by a resin 124 placed in magnet insert hole 126.

Figure 2:
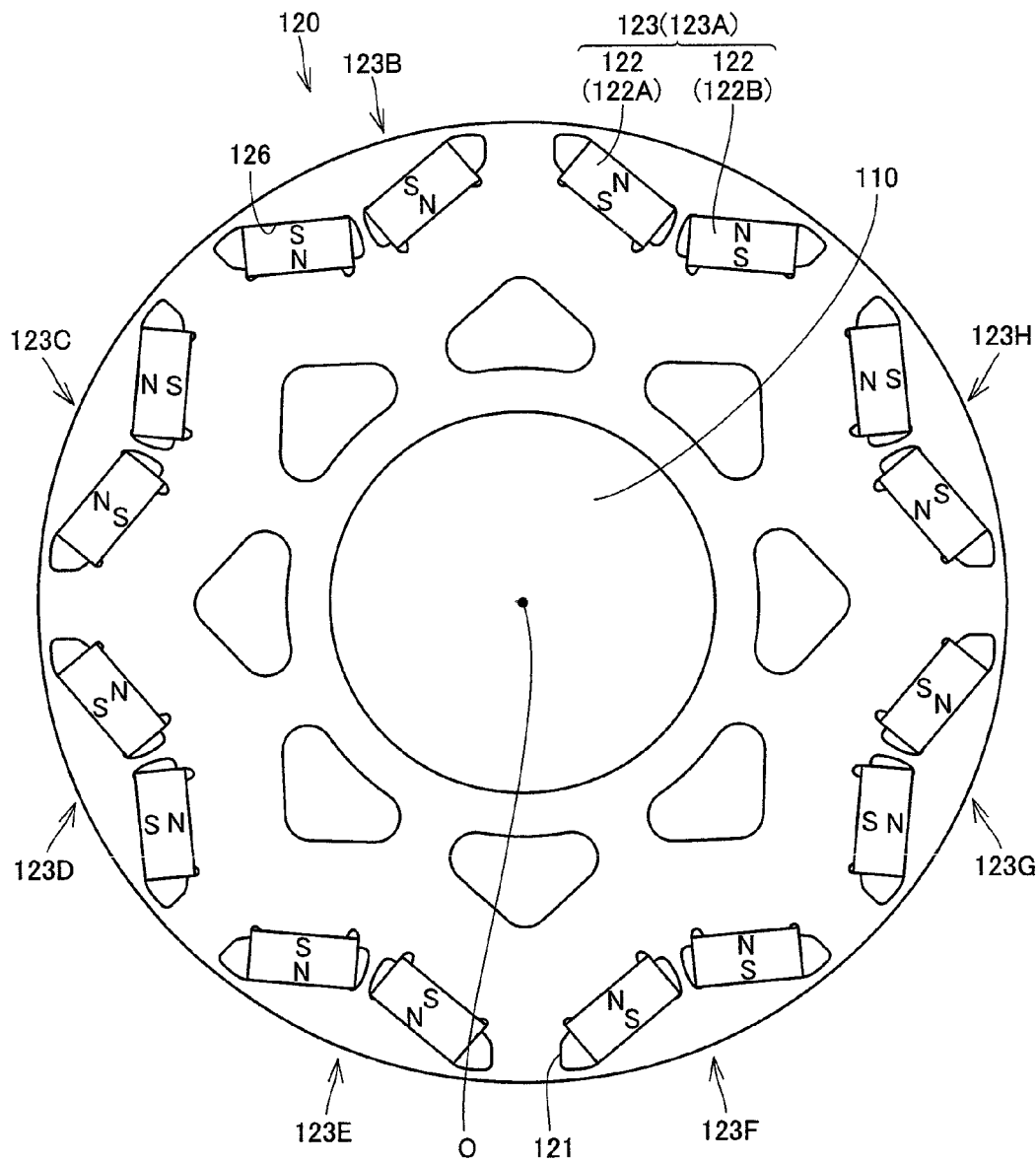
FIG. 2 is a plan view of a rotor.

FIG. 2 is a plan view of rotor 120. As shown in FIG. 2, rotor 120 includes eight magnet pairs 123A to 123H that are circumferentially spaced from each other.

Magnet pairs 123A to 123H each include two permanent magnets 122A, 122B slightly spaced from each other in the circumferential direction.

Magnet pairs 123A to 123H are arranged such that respective magnetic poles on the outer periphery side of rotor 120 are different between magnet pairs circumferentially adjacent to each other. Specifically, regarding magnet pairs 123A, 123C, 123E, 123G, permanent magnets 122A, 122B constituting each magnet pair are arranged such that the N pole is located on the outer periphery side of rotor 120. Regarding magnet pairs 123B, 123D, 123F, 123H, permanent magnets 122A, 122B constituting each magnet pair are arranged such that the S pole is located on the outer periphery side of rotor 120. Thus, the number of magnet poles of rotating electric machine 100 in the first embodiment is eight.

Figure 3:
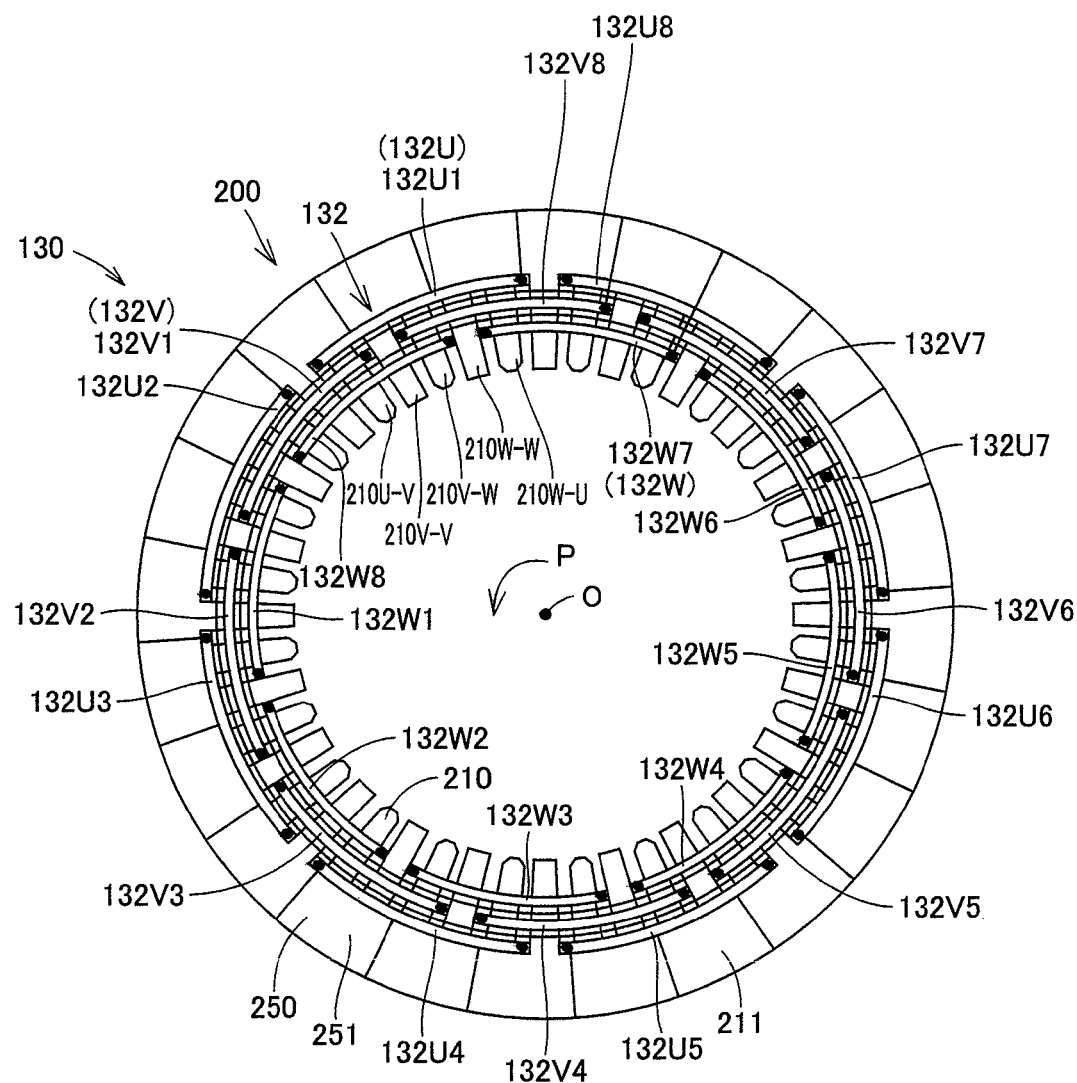
FIG. 3 is a plan view of a stator.

FIG. 3 is a plan view of stator 130. As shown in FIG. 3, stator 130 includes an annularly-shaped stator core 200 centered at rotational central line O, and a multiphase coil 132 attached to stator core 200. In FIG. 3, P represents the direction in which the rotor is rotated.

Stator core 200 includes a yoke 211 extending annularly in the circumferential direction of stator core 200, and a plurality of (48) stator teeth extending radially inward from the inner circumferential surface of yoke 211. Between stator teeth 210, a plurality of (48) slots are formed.

Stator core 200 is constituted of a plurality of split stator cores 250 arranged annularly in the circumferential direction of stator core 200. Each split stator core 250 includes a split yoke 251 extending in the circumferential direction of stator core 200, and a stator tooth 210 extending radially inward from the circumferential surface of split yoke 251. In rotating electric machine 100 of the first embodiment, each split stator core 250 has two stator teeth 210 that are circumferentially spaced from each other.

Multiphase coil 132 includes a U phase coil 132U, a V phase coil 132V and a W phase coil 132W, and thus multiphase coil 132 is a three-phase coil.

U phase coil 132U is located on the radially outermost side, and V phase coil 132V is placed on the radially inner side with respect to U phase coil 132U. W phase coil 132W is placed on the radially inner side with respect to V phase coil 132V.

U phase coil 132U includes unit U phase coils 132U1 to 132U8, V phase coil 132V includes unit V phase coils 132V1 to 132V8, and W phase coil 132W includes unit W phase coils 132W1 to 132W8. Unit phase coils of the same phase are directly connected with each other.

Each unit phase coil is wound around a plurality of corresponding stator teeth 210, and one stator tooth 210 is located between unit phase coils of the same phase. Each unit phase coil is wound in the opposite direction to the direction in which an adjacent unit phase coil of the same phase is wound.

Specifically, the direction in which unit U phase coils 132U1, 132U3, 132U5, 132U7 are wound and the direction in which unit U phase coils 132U2, 132U4, 132U6, 132U8 are wound are opposite to each other. Here, the number of unit phase coils is equal to the number of magnetic poles. In rotating electric machine 100, one type of unit phase coil (winding) is wound in one slot, which is thus single layer winding. Further, one type of unit phase coil is distributed among two slots adjacent to each other, which is thus called double slot distributed coil. The number of slots among which the coil is distributed is thus two.

Here, the number of slots 220 (r: 48) is determined by the number of slots among which one type of unit phase coil is distributed (natural number (natural number herein excludes zero) s: 2), the number of magnetic poles (natural number m: 8) and the number of phases (natural number n: 3), and these numbers have a relation as defined by expression (1) below:

number of slots($r$)=number of slots where coil is distributed($s$)×number of magnetic poles($m$)×number of phases($n$)  (1).

Figure 4:
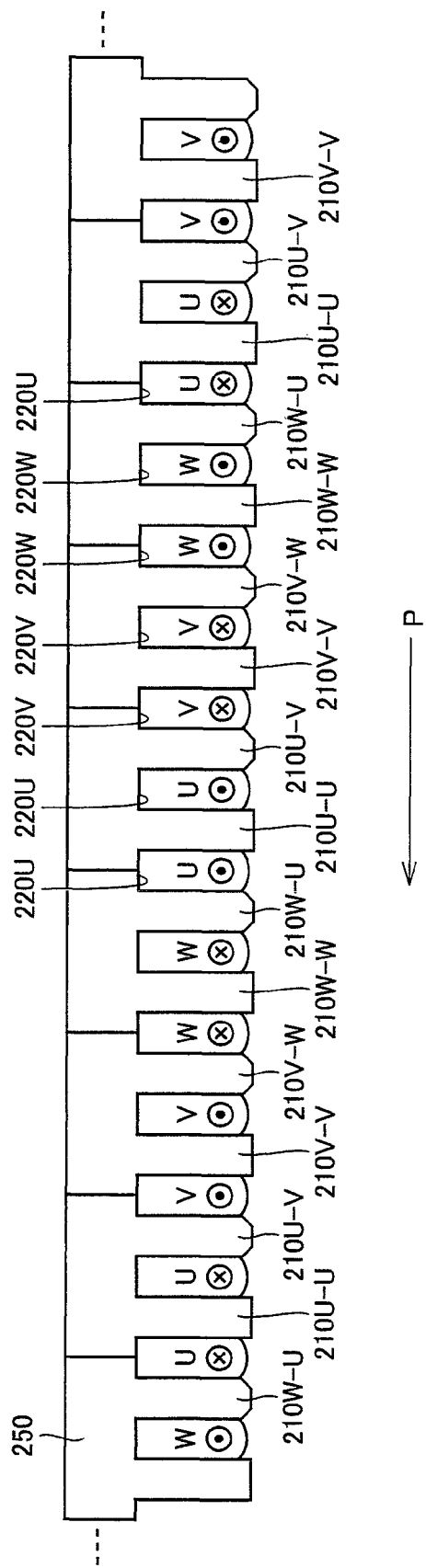
FIG. 4 is a developed view of a stator core shown in FIG. 3.

FIG. 4 is a developed view of stator core 200 shown in FIG. 3. As shown in FIG. 4, slots 220 include a U phase slot 220U in which a unit U phase coil is inserted, a V phase slot 220V in which a unit V phase coil is inserted, and a W phase slot 220W in which a unit W phase coil is inserted.

Stator teeth 210 include inter-homo-phase teeth (210U-U, 210V-V, 210W-W), and inter-hetero-phase teeth 210W-U, 210U-V, 210V-W.

In two slots 220 located on the laterally opposite sides with respect to an inter-homo-phase tooth, unit phase coils of the same phase are inserted respectively. Namely, an inter-homo-phase tooth is sandwiched between unit phase coils of the same phase. Inter-homo-phase teeth include inter-U-phase teeth 210U-U, inter-V-phase teeth 210V-V and inter-W-phase teeth 210W-W.

Inter-U-phase tooth 210U-U is located between U phase slots 220U, inter-V-phase tooth 210V-V is located between V phase slots 220V, and inter-W-phase tooth 210W-W is located between W phase slots 220W.

In respective slots 220 located on the laterally opposite sides with respect to inter-hetero-phase teeth 210W-U, 210U-V, 210V-W each, unit phase coils of different phases are inserted respectively. Namely, inter-hetero-phase teeth 210W-U, 210U-V, 210V-W are each sandwiched between unit phase coils of different phases.

Inter-hetero-phase tooth 210W-U is located between W phase slot 220W and U phase slot 220U. Inter-hetero-phase tooth 210U-V is located between U phase slot 220U and V phase slot 220V. Inter-hetero-phase tooth 210V-W is located between V phase slot 220V and W phase slot 220W.

Two U phase slots 220U, two W phase slots 220W and two V phase slots 220V are arranged in order in rotational direction P of rotor 120. Accordingly, inter-U-phase tooth 210U-U, inter-hetero-phase tooth 210W-U, inter-W-phase tooth 210W-W, inter-hetero-phase tooth 210V-W, inter-V-phase tooth 210V-V, and inter-hetero-phase tooth 210U-V are arranged in order in rotational direction P. In this way, inter-homo-phase teeth and inter-hetero-phase teeth are alternately located in rotational direction P.

Figure 5:
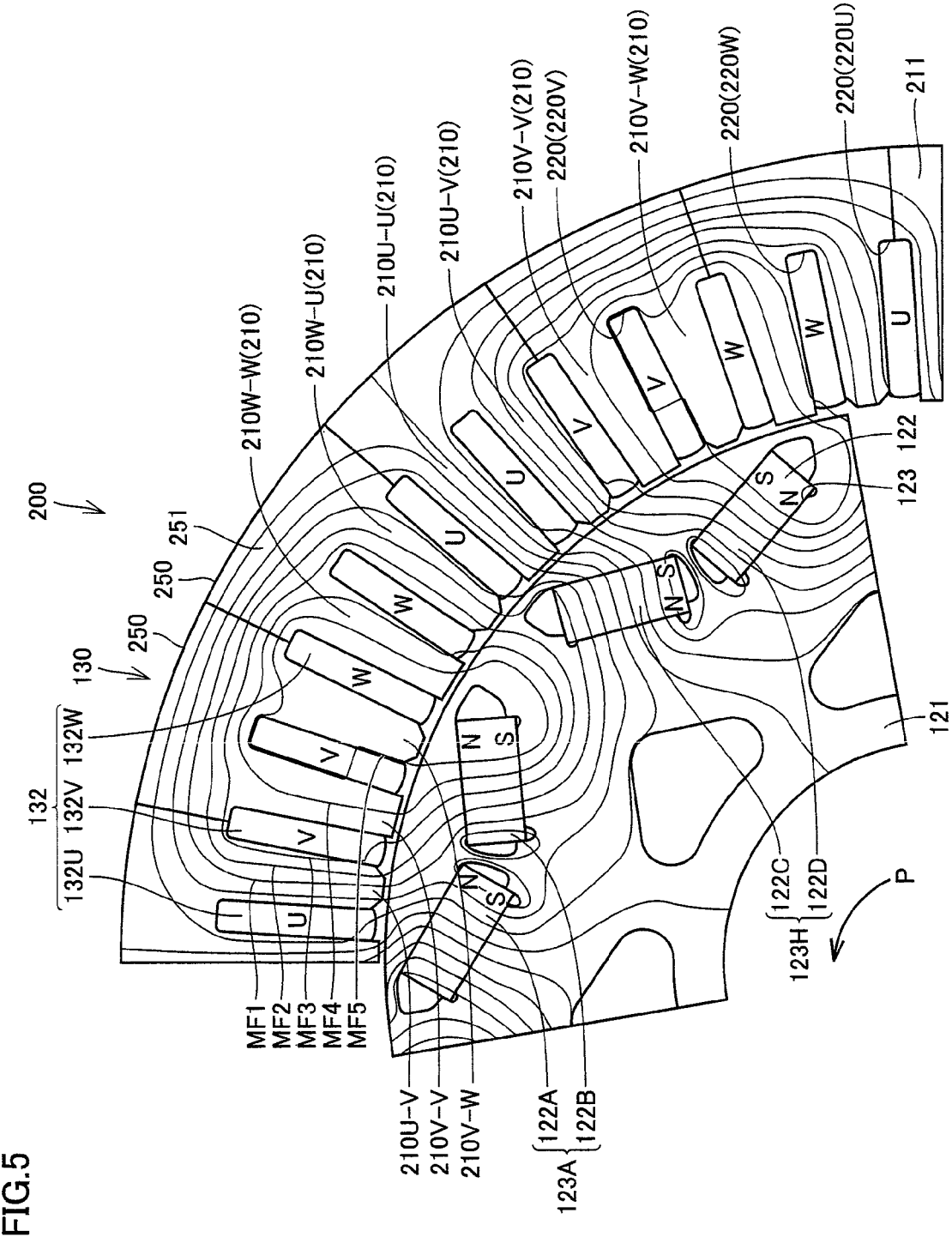
FIG. 5 is a plan view for illustrating the result of a simulation, showing magnetic flux paths from each pair of magnets.

FIG. 5 is a plan view for illustrating the result of a simulation, showing magnetic flux paths from each magnet pair. As simulation software, electromagnetic field analysis software such as JMAG® (produced by JSOL Corporation) was used.

As shown in FIG. 5, magnetic fluxes are radiated from permanent magnets 122A, 122B of magnet pairs 123A to 123H provided in rotor 120, and the magnetic fluxes proceed in respective magnetic circuits, proceed in rotor 120 and then in stator 130, then return from stator 130 to rotor 120, and thereafter return to permanent magnets 122A, 122B each. Here, particularly magnetic fluxes MF1 to MF5 from permanent magnet 122B of magnet pair 123A will be studied.

Among magnetic fluxes MF1 to MF5, magnetic flux MF1 passes through the outermost magnetic circuit, while magnetic fluxes MF2 to MF5 pass through respective magnetic circuits located in order on the inner side with respect to the magnetic circuit of magnetic flux MF1. Therefore, among magnetic fluxes MF1 to MF5 radiated from permanent magnet 122B, magnetic flux MF1 passes through the frontmost position in rotational direction P.

Thus, as rotor 120 rotates in rotational direction P, magnetic flux MF1 also moves forward in rotational direction P, and successively moves from inter-hetero-phase tooth 210V-W to inter-V-phase tooth 210V-V and further from inter-V-phase tooth 210V-V to inter-hetero-phase tooth 210U-V as shown in FIG. 5.

Figure 6:
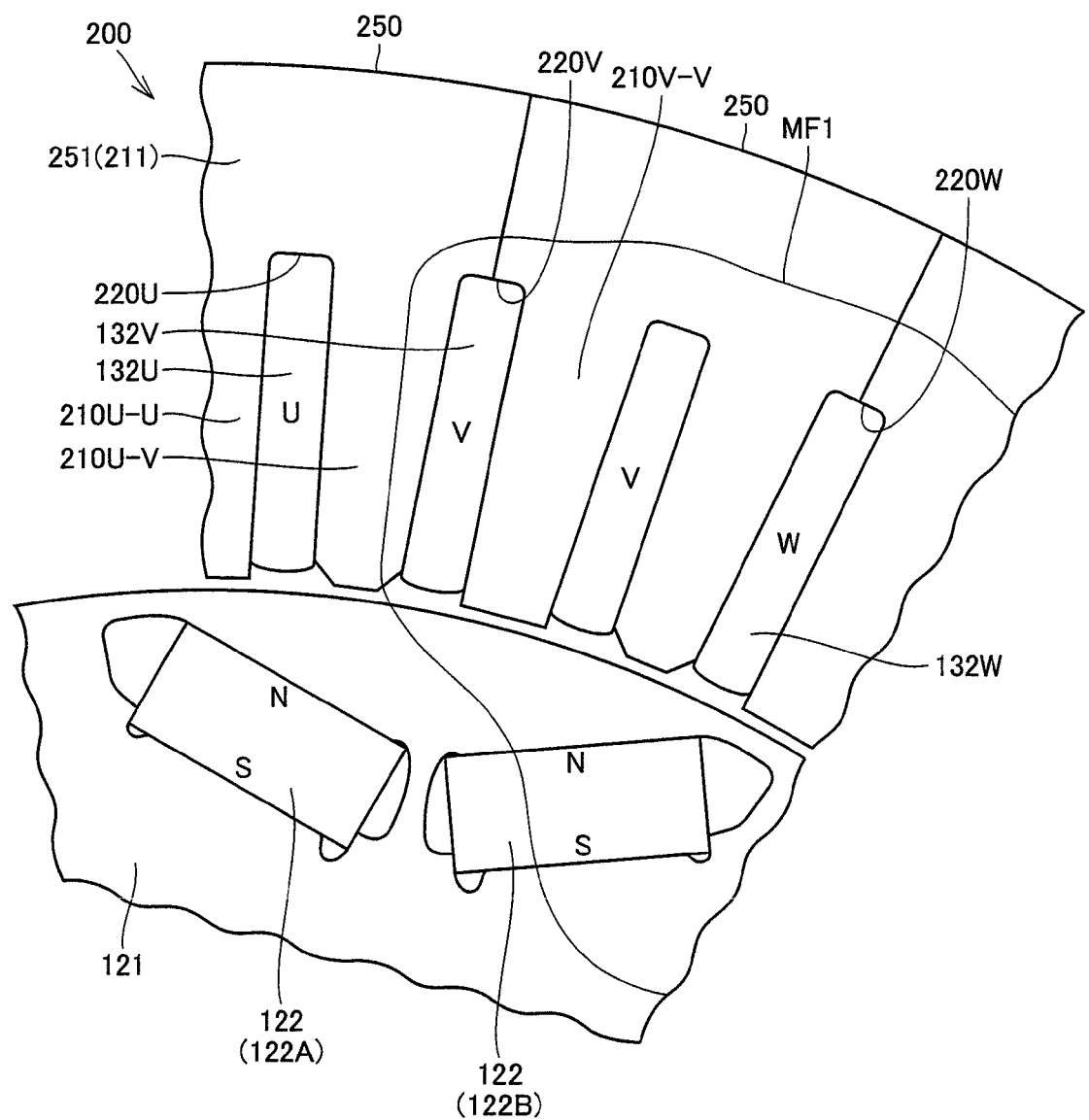
FIG. 6 is a plan view where the rotating electric machine in the state shown in FIG. 5 is partially enlarged.
Figure 7:
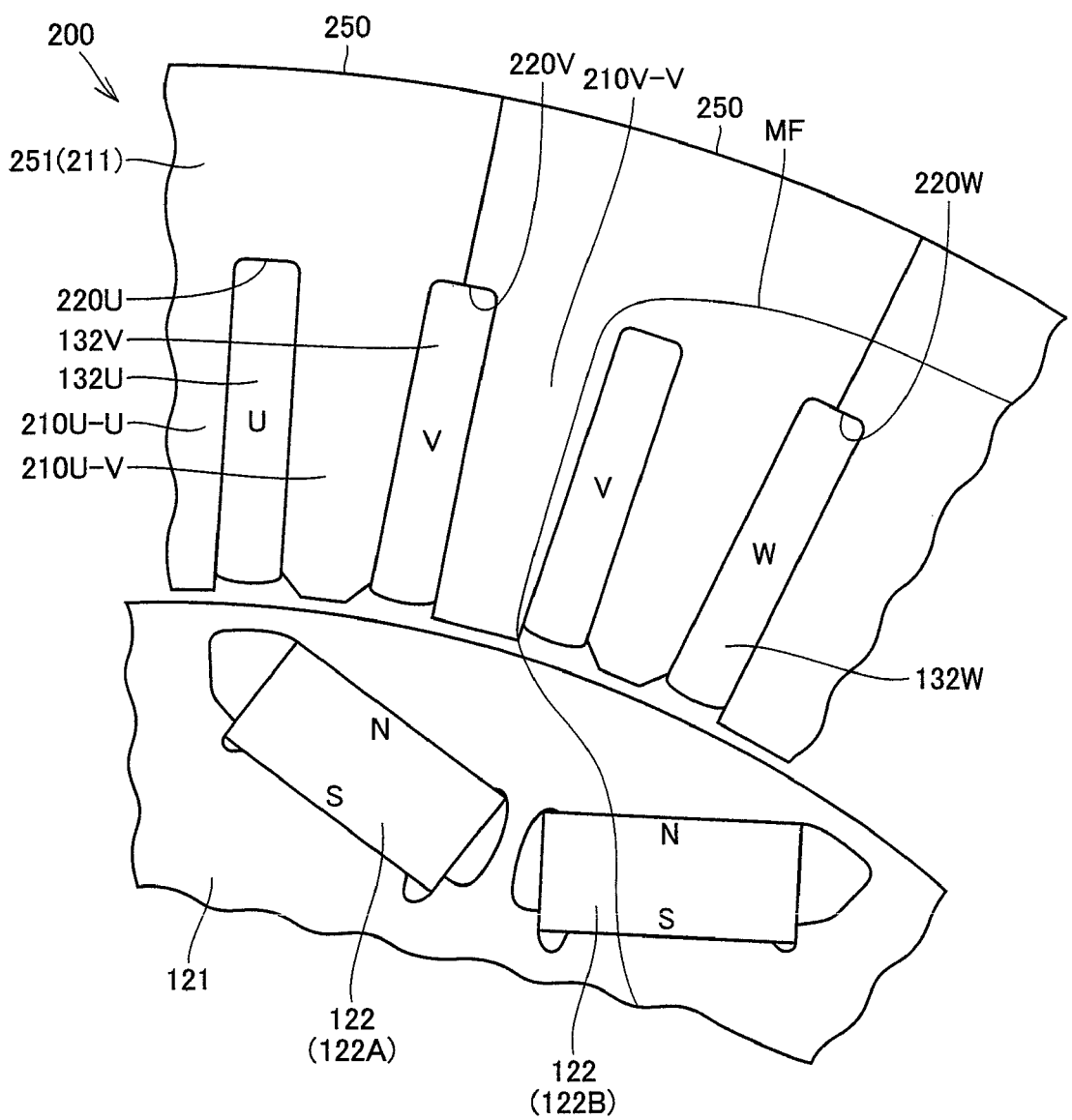
FIG. 7 is a plan view where the rotor is located slightly backward in the rotational direction relative to the rotor in the state shown in FIG. 6.

FIG. 6 is a plan view where rotating electric machine 100 in the state shown in FIG. 5 is partially enlarged, and FIG. 7 is a plan view showing the state where rotor 120 is located slightly backward in rotational direction P relative to the state shown in FIG. 6.

In FIG. 6, magnetic flux MF1 emitted from permanent magnet 122B reaches the outer surface of rotor 120. Magnetic flux MF1 then passes through an air gap to reach inter-hetero-phase tooth 210U-V. Magnetic flux MF1 proceeds in inter-hetero-phase tooth 210U-V, reaches yoke 211 and proceeds in yoke 211 backward in rotational direction P.

Specifically, FIG. 7 shows the state located backward by an electrical angle of 30 degrees with respect to the state shown in FIG. 6. Rotor 120 in the state shown in FIG. 7 is rotated in rotational direction P to reach the state shown in FIG. 6.

Here, in FIG. 7, magnetic flux MF1 enters inter-V-phase tooth 210V-V located backward in rotational direction P with respect to inter-hetero-phase tooth 210U-V.

Figure 8:
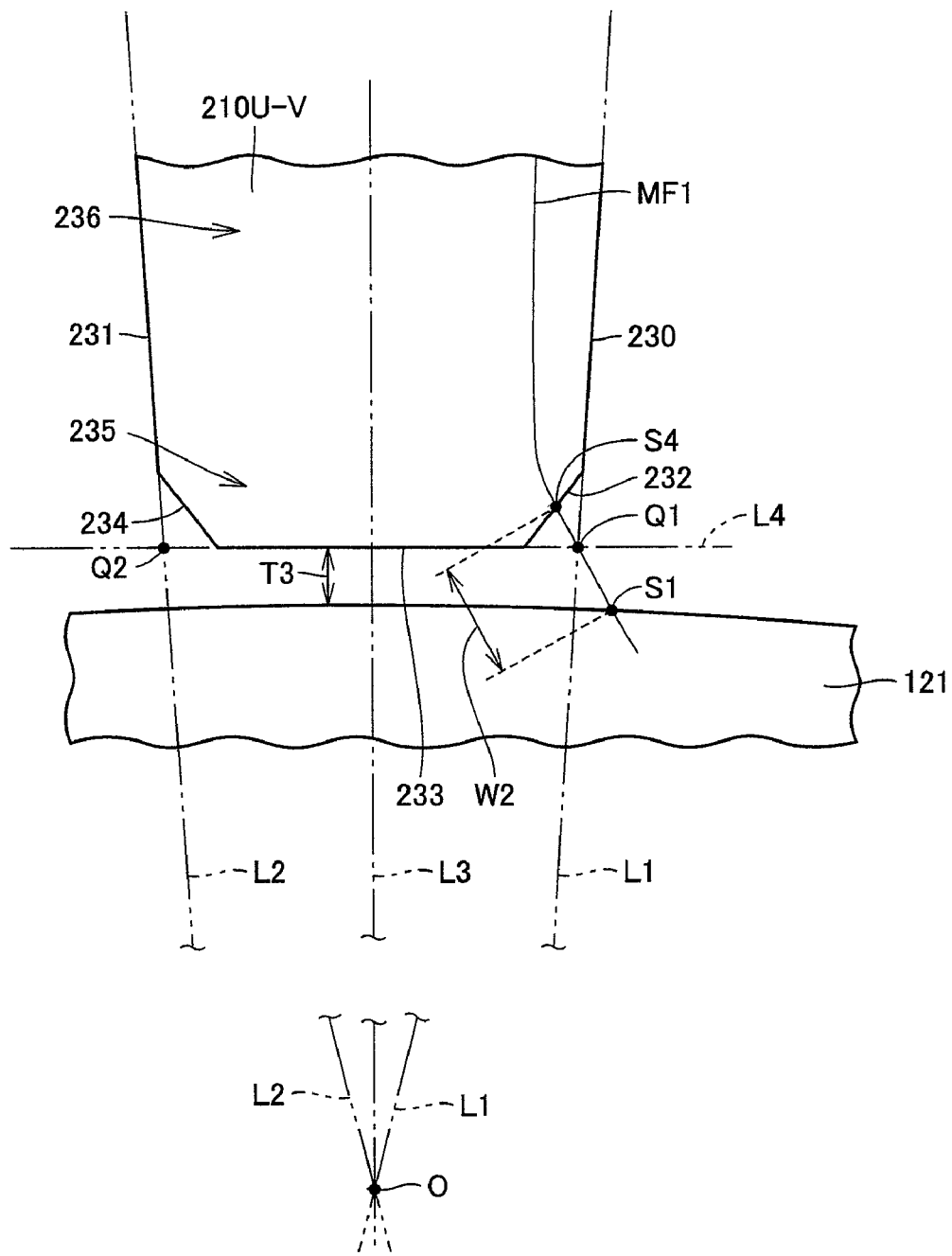
FIG. 8 is a plan view showing a structure of a head portion of an inter-hetero-phase tooth.
Figure 9:
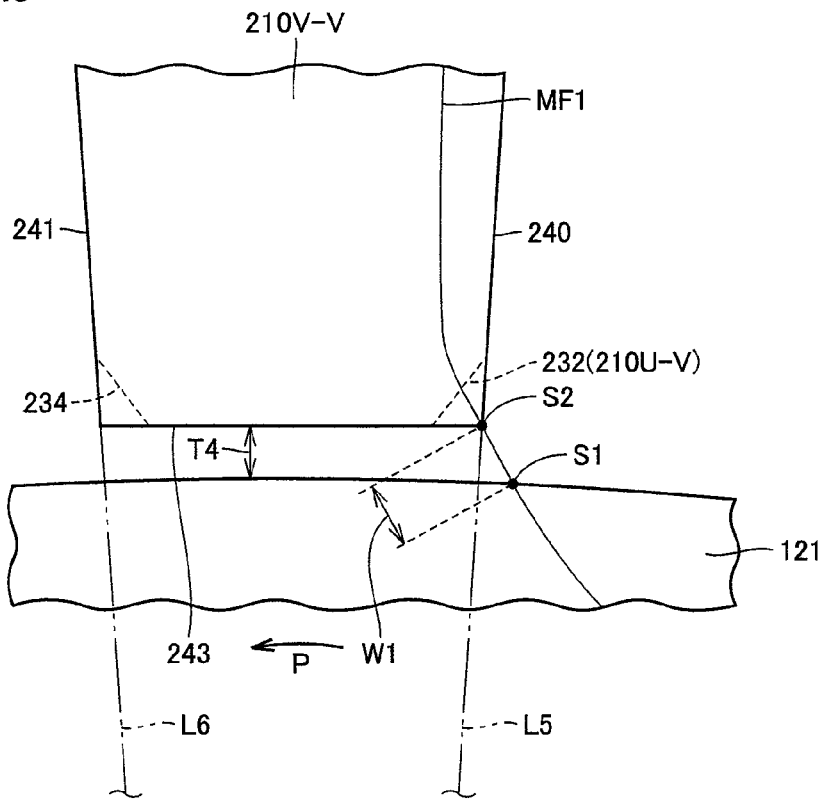
FIG. 9 is a plan view showing a structure of a head portion of an inter-V-phase tooth.

FIG. 8 is a plan view showing a structure of a head portion of inter-hetero-phase tooth 210U-V, and FIG. 9 is a plan view showing a structure of a head portion of inter-V-phase tooth 210V-V.

Inter-hetero-phase tooth 210U-V includes a body 236 defined by a pair of a side 230 and a side 231 located laterally in rotational direction P, and a head 235 extending continuously from and located radially inward with respect to body 236.

Head 235 includes a chamfer 232 extending continuously from side 230 and extending frontward in rotational direction P with respect to side 230, a chamfer 234 extending continuously from side 231 and extending backward in rotational direction P with respect to side 231, and an inner end face 233 extending continuously from and located radially inward with respect to chamfer 234 and chamfer 232.

In rotating electric machine 100 of the present embodiment, side 230 and side 231 are inclined to approach each other toward the radially inner side.

It is supposed here that an imaginary axis line extending along side 230 and perpendicularly crossing rotational central line O is imaginary side axis line L1, and an imaginary axis line extending along side 231 and perpendicularly crossing rotational central line O is imaginary side axis line L2. It is further supposed that a radially extending imaginary axis line crossing the center in the width direction (rotational direction P) of inner end face 233 and crossing rotational central line O is imaginary radial axis line L3, and an imaginary line extended from the inner end face (inner circumferential surface) is imaginary line L4.

It is also supposed that an imaginary intersection of imaginary side axis line L1 and imaginary line L4 is imaginary intersection Q1, and an imaginary intersection of imaginary side axis line L2 and imaginary line L4 is imaginary intersection Q2.

Chamfer 232 is located on imaginary side axis line L2 side with respect to imaginary intersection Q1, and extends away from imaginary side axis line L1 and approaches imaginary side axis line L2 and imaginary radial axis line L3, from the boundary between chamfer 232 and side 230 toward the radially inner side.

Further, chamfer 234 is located on imaginary side axis line L1 side with respect to imaginary intersection Q2, and extends away from imaginary side axis line L2 and approaches imaginary side axis line L1 and imaginary radial axis line L3, from the boundary between chamfer 234 and side 231 toward the radially inner side.

Head 235 thus decreases in circumferential width such that head 235 extends away from imaginary side axis line L1 and imaginary side axis line L2 from body 236 toward the radially inner side, namely tapers. In contrast, inter-V-phase tooth 210V-V in FIG. 9 does not have tapering head 235 like that of inter-hetero-phase tooth 210U-V as described above. Instead, sides 240 and 241 located laterally in the circumferential direction incline to gradually approach each other toward the radially inner side, and an inner end face 243 extends continuously from sides 240, 241. Preferably, inner end face 243 and inner end face 233 are each an arc whose center is located at rotational central line O.

Then, in the state as shown in FIG. 9 where inter-V-phase tooth 210V-V and inter-hetero-phase tooth 210U-V are superposed on each other, sides 230, 231 of inter-hetero-phase tooth 210U-V and sides 240, 241 of inter-V-phase tooth 210V-V overlap each other, and inner end face 233 of inter-hetero-phase tooth 210U-V and inner end face 243 of inter-V-phase tooth 210V-V overlap each other.

As for chamfer 232 and chamfer 234, they are located in inter-hetero-phase tooth 210V-V.

Thus, as shown in FIG. 9, chamfer 232 located between side 230 and inner end face 233 of inter-hetero-phase tooth 210U-V is formed to be located further away from the surface of rotor 120 toward the radially outer side of stator core 200, relative to the corner located between side 240 and inner end face 243 of inter-V-phase tooth 210V-V.

Likewise, chamfer 234 located between side 231 and inner end face 233 of inter-hetero-phase tooth 210U-V is located further away from the surface of rotor 120 toward the radially outer side of stator core 200, relative to the corner located between side 241 and inner end face 243 of inter-V-phase tooth 210V-V.

When rotating electric machine 100 is to be driven, U phase coil 132U, V phase coil 132V and W phase coil 132W are supplied with respective alternating currents whose phases are different from each other to rotate rotor 120. While rotor 120 is rotating, magnetic flux MF1 enters inter-V-phase tooth 210V-V as shown in FIG. 9. As rotor 120 is rotating, magnetic flux MF1 is displaced frontward in rotational direction P and accordingly reaches the inside of inter-V-phase tooth 210V-V.

Specifically, referring to FIG. 9, magnetic flux MF1 is emitted from emission position S1 at the surface of rotor 120 toward inter-V-phase tooth 210V-V. Emitted magnetic flux MF1 proceeds frontward in rotational direction P while proceeding radially outward, and reaches inter-V-phase tooth 210V-V. Therefore, when magnetic flux MF1 starts to enter inter-V-phase tooth 210V-V while rotor 120 is successively rotating, magnetic flux MF1 enters from the corner defined by side 240 and inner end face 243 and its vicinity of inter-V-phase tooth 120V-V.

Then, as rotor 120 is further rotating, magnetic flux MF1 reaches the inside of inter-hetero-phase tooth 210U-V as shown in FIG. 8. Here, magnetic flux MF1 as described above enters inter-hetero-phase tooth 210U-V from chamfer 232.

At this time, magnetic flux MF1 is emitted from emission position S1 at the surface of rotor 120. Magnetic flux MF1 enters inter-hetero-phase tooth 210U-V from entrance position S4 of inter-hetero-phase tooth 210U-V. In the example shown in FIG. 8, entrance position S4 is located at chamfer 232.

Chamfer 232 of inter-hetero-phase tooth 210U-V is located radially outward relative to the corner defined by side 240 and inner end face 243 of inter-V-phase tooth 210V-V. Therefore, path length W2 between emission position S1 and entrance position S4 shown in FIG. 8 is longer than path length W1 between emission position S1 and entrance position S2 shown in FIG. 9.

Thus, the distance between rotor 120 and inter-hetero-phase tooth 210U-V over which magnetic flux MF1 emitted from rotor 120 proceeds to start to enter inter-hetero-phase tooth 210U-V is longer than the distance between rotor 120 and inter-V-phase tooth 210V-V over which magnetic flux MF1 emitted from rotor 120 proceeds to start to enter inter-V-phase tooth 210V-V.

While respective shapes of inter-V-phase tooth 210V-V and inter-hetero-phase tooth 210U-V have been described above with reference to FIGS. 8 and 9, other inter-homo-phase teeth are formed similarly to inter-V-phase tooth 210V-V, and other inter-hetero-phase teeth are also formed similarly to inter-hetero-phase tooth 210U-V. While rotating electric machine 100 is being driven, magnetic fluxes are generated from respective U phase coil 132U, V phase coil 132V and W phase coil 132W, and the magnetic fluxes from respective coils flow in stator teeth 210 each.

At this time, the state of flow of the magnetic fluxes in inter-homo-phase teeth (inter-U-phase teeth 210U-U, inter-V-phase teeth 210V-V and inter-W-phase teeth 210W-W) and the state of flow of the magnetic fluxes in inter-hetero-phase teeth 210W-U, 210U-V, 210V-W are different from each other.

If respective shapes of all stator teeth 210 are identical and respective dimensions of the air gaps between stator teeth 210 and rotor 120 are identical, the resistance to a magnetic flux from a permanent magnet provided in rotor 120 proceeding in inter-hetero-phase teeth 210W-U, 210U-V, 210V-W is smaller than the resistance to the magnetic flux in inter-homo-phase teeth (inter-U-phase teeth 210U-U, inter-V-phase teeth 210V-V, inter-W-phase teeth 210W-W).

In contrast, in the embodiment as described above, the path length of magnetic flux MF1 between rotor 120 and an inter-hetero-phase tooth over which the magnetic flux proceeds and starts to enter the inter-hetero-phase tooth is longer than the path length of magnetic flux MF1 between rotor 120 and an inter-homo-phase tooth over which the magnetic flux proceeds and starts to enter the inter-homo-phase tooth, when each multiphase coil is supplied with alternating current.

Accordingly, the reluctance of the magnetic circuit of the magnetic flux from permanent magnet 122 when the magnetic flux starts to enter an inter-hetero-phase tooth and the reluctance of the magnetic circuit of the magnetic flux when the magnetic flux starts to enter an inter-homo-phase tooth are identical or close to each other.

Therefore, even if the magnetic flux from permanent magnet 122 proceeds from an inter-homo-phase tooth to an inter-hetero-phase tooth, a large variation of the reluctance of the magnetic circuit where the magnetic flux passes can be suppressed. Thus, when the magnetic flux from permanent magnet 122 proceeds from an inter-homo-phase tooth to an inter-hetero-phase tooth, a sudden decrease of the reluctance can be suppressed. Accordingly a torque ripple (24th-order component of rotation: sixth-order component of electrical angle) occurring to rotating electric machine 100 can be reduced, and generation of vibrations can be suppressed.

Chamfer 232 extends toward the radially inner side of stator core 120, while extending frontward in rotational direction P.

Thus, as rotor 120 is rotating, the reluctance between rotor 120 and inter-hetero-phase teeth 210W-U, 210U-V, 210V-W decreases.

Further, the amount of magnetic fluxes from permanent magnets 122 increases and a large torque applied to rotor 120 can be ensured.

Then, as the magnetic flux from permanent magnet 122 reaches inner end face 233, the magnetic resistance of the magnetic circuit of the magnetic flux becomes minimum while the magnetic flux amount increases. Accordingly, the torque applied to rotor 120 can increased.

In rotating machine 100 of the present embodiment, chamfer 234 is formed at the position opposite to chamfer 232 of head 235 of the inter-hetero-phase tooth.

This chamfer 234 inclines toward the radially inner side of stator core 200 in the opposite direction to rotational direction P. Therefore, if rotor 120 of rotating electric machine 100 is rotationally driven in the opposite direction to rotational direction P, the torque ripple occurring to rotating electric machine 100 can also be reduced.

Figure 10:
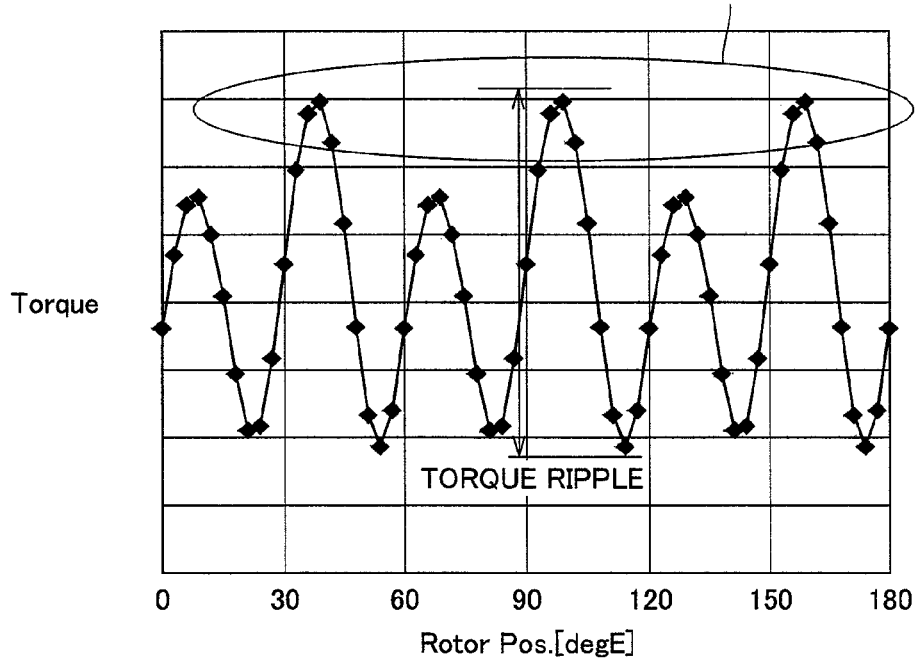
FIG. 10 is a graph illustrating vibrations generated when a rotating electric machine of a comparative example is driven.

FIG. 10 is a graph illustrating vibrations generated when a rotating electric machine of a comparative example is driven. In FIG. 10, the horizontal axis represents rotational angle (electrical angle) of rotor 120, and the vertical axis represents torque occurring to rotor 120. In the rotating electric machine of the comparative example, respective shapes of all stator teeth 210 are identical to the shape of inter-U-phase teeth 210U-U. Further, respective dimensions of air gaps between stator teeth 210 and rotor 120 are also identical. In addition, in the rotating electric machine of the comparative example, the number of slots is 48, the number of magnetic poles is 8 and the number of phases is 3 that are equal to respective numbers of rotating electric machine 100 of the present embodiment.

In the rotating electric machine of the comparative example structured in the above-described manner as well, respective states of flow of a magnetic flux from a multiphase coil passing in an inter-homo-phase tooth and that passing in an inter-hetero-phase tooth are different from each other. Because of this, the reluctance of the magnetic circuit passing in the inter-hetero-phase tooth and rotor 120 is lower than the reluctance of the magnetic circuit passing in the inter-homo-phase tooth and rotor 120.

Then, when the magnetic flux from the permanent magnet proceeds from the inter-homo-phase tooth to the inter-hetero-phase tooth, the reluctance suddenly decreases, resulting in a large torque ripple. As shown in FIG. 10, in the rotating electric machine of the comparative example, the peak of torque occurs every 60 degrees of the electrical angle.

Figure 11:
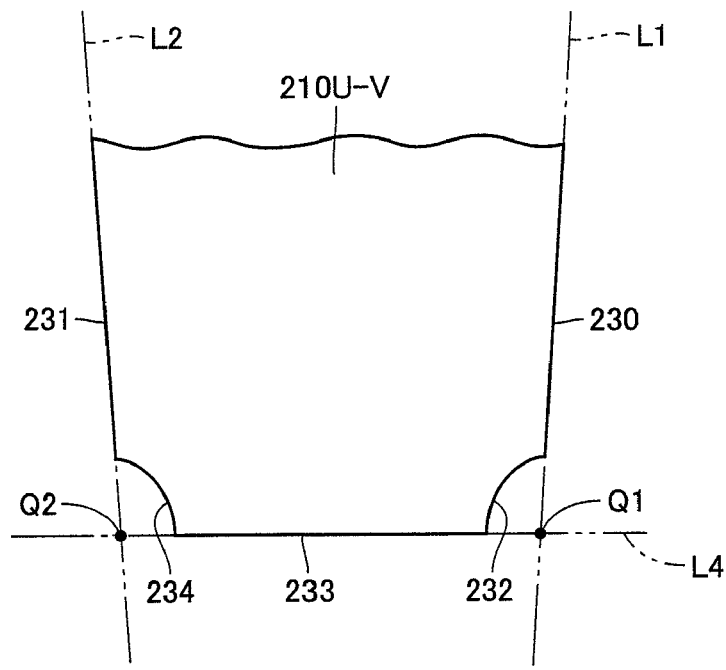
FIGS. 11 and 12 are each a plan view of an inter-hetero-phase tooth showing a modification of a chamfer.
Figure 12:
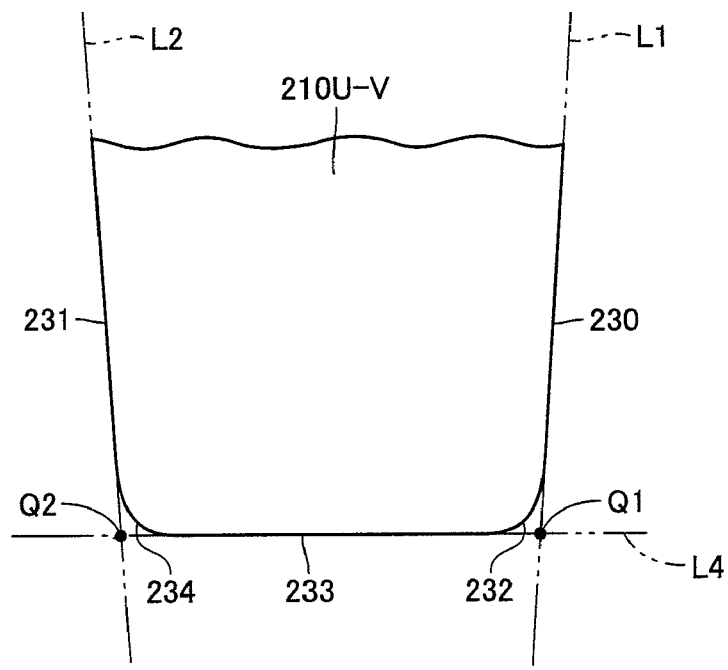

While FIGS. 1 to 9 as described above illustrate an example where chamfers 232, 234 are tapering surfaces, the shape of chamfers 232, 234 is not limited to such a shape. FIGS. 11 and 12 are each a plan view of an inter-hetero-phase tooth 210U-V illustrating a modification of chamfers 232, 234. As shown in FIGS. 11 and 12, chamfers 232, 234 may have the shape of a curve.

Figure 13:
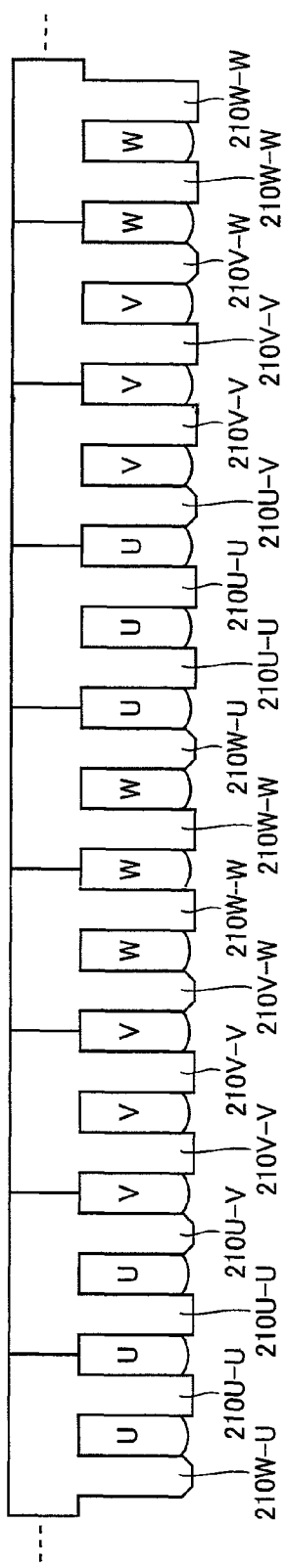
FIG. 13 is a developed view of a stator where the number of slots (s) among which a coil is distributed is three.

Further, while FIGS. 1 to 9 illustrate the rotating electric machine where the number of slots (s) among which the coil is distributed is two, the number of slots (s) among which the coil is distributed may be 3 for example. FIG. 13 is a developed view of a stator 130 where the number of slots (s) among which the coil is distributed is three (triple slot distributed coil). In the case of the triple slot distributed coil, one type of unit phase coil is distributed among three slots adjacent to each other.

In FIG. 13, three U phase slots 220U, three V phase slots 220V and three W phase slots 220W are arranged in order. Therefore, between inter-hetero-phase teeth, two inter-homo-phase teeth are located. In other words, between inter-hetero-phase teeth, inter-homo-phase teeth (tooth) of the number corresponding to (((the number of slots (s) among which a coil is distributed)−1) is located. Respective heads of inter-heterophase teeth have chamfers 232, 234 as formed.

Figure 14:
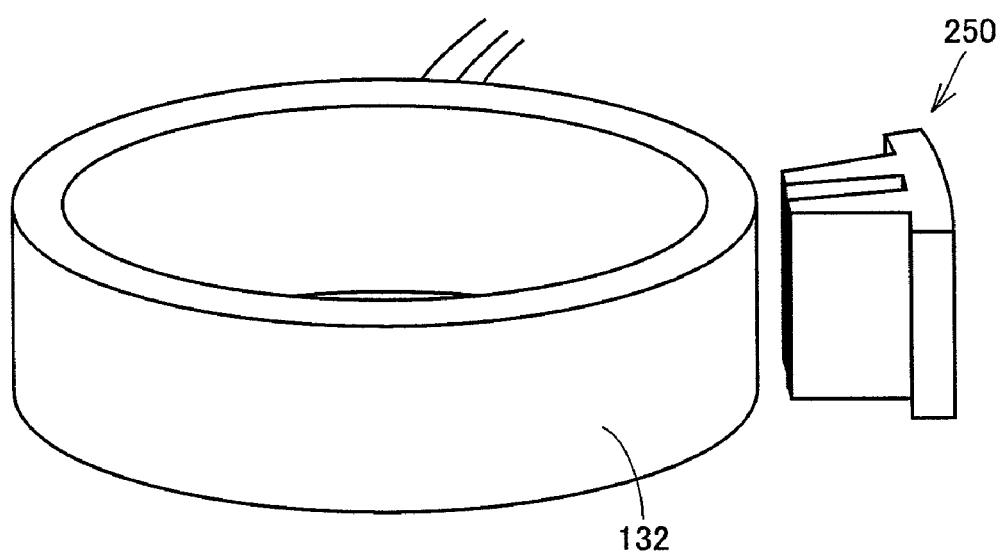
FIG. 14 is a schematic diagram illustrating a method of manufacturing a rotating electric machine according to an embodiment of the present invention.

FIG. 14 is a schematic view illustrating a method of manufacturing rotating electric machine 100 according to the present embodiment. As shown in FIG. 14, in the process of manufacturing stator 130, a tubular multiphase coil 132 wound in advance is prepared. Then, from the outer circumferential surface of this multiphase coil 132, split stator cores 250 are inserted successively to produce stator 130.

At this time, each stator tooth 210 of stator core 200 is formed such that the tooth tapers toward the radially inner side.

For example, as shown in FIG. 8 referenced above, side 230 and side 231 of each inter-hetero-phase tooth are formed such that the sides approach each other toward the radially inner side of stator core 200. Further, as shown in above-referenced FIG. 9, sides 240, 241 of each inter-homo-phase tooth are also formed such that the sides approach each other toward the radially inner side of stator core 200.

Since each stator tooth 210 is thus tapered toward the radially inner side, split stator core 250 can be easily inserted from the outer circumferential surface of multiphase coil 132. Further, multiphase coil 132 can be prevented from being damaged by each stator tooth 210.

Stator 130 is thus produced and thereafter stator 130 is mounted in a motor case and rotor 120 is disposed in stator 130. Accordingly, rotating electric machine 100 is manufactured.

Second Embodiment

With reference to FIGS. 15 to 18, a rotating electric machine 100 according to a second embodiment of the present invention will be described. In the structures shown in FIGS. 15 to 18, components identical or corresponding to those shown in FIGS. 1 to 14 are denoted by the same reference characters and the description thereof may not be repeated depending on the case.

Figure 15:
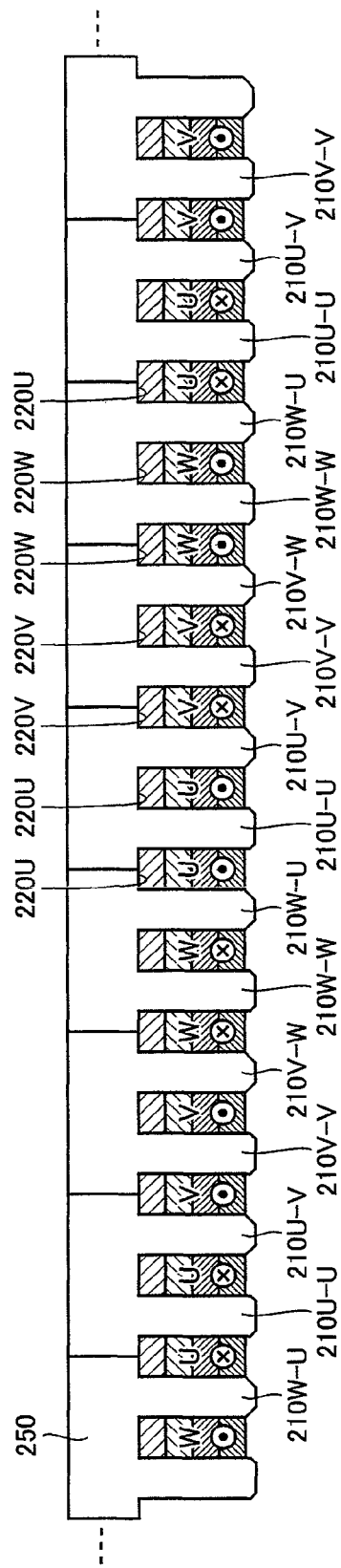
FIG. 15 is a developed view of a stator of a rotating electric machine according to a second embodiment of the present invention.

FIG. 15 is a developed view of a stator 130 according to the second embodiment of the present invention. As shown in FIG. 15, in rotating electric machine 100 of the second embodiment, chamfers are formed not only on inter-hetero-phase teeth 210U-V, 210V-W and 210W-U, but also on inter-U-phase teeth 210U-U, inter-V-phase teeth 210V-V and inter-W-phase teeth 210W-W.

Figure 16:
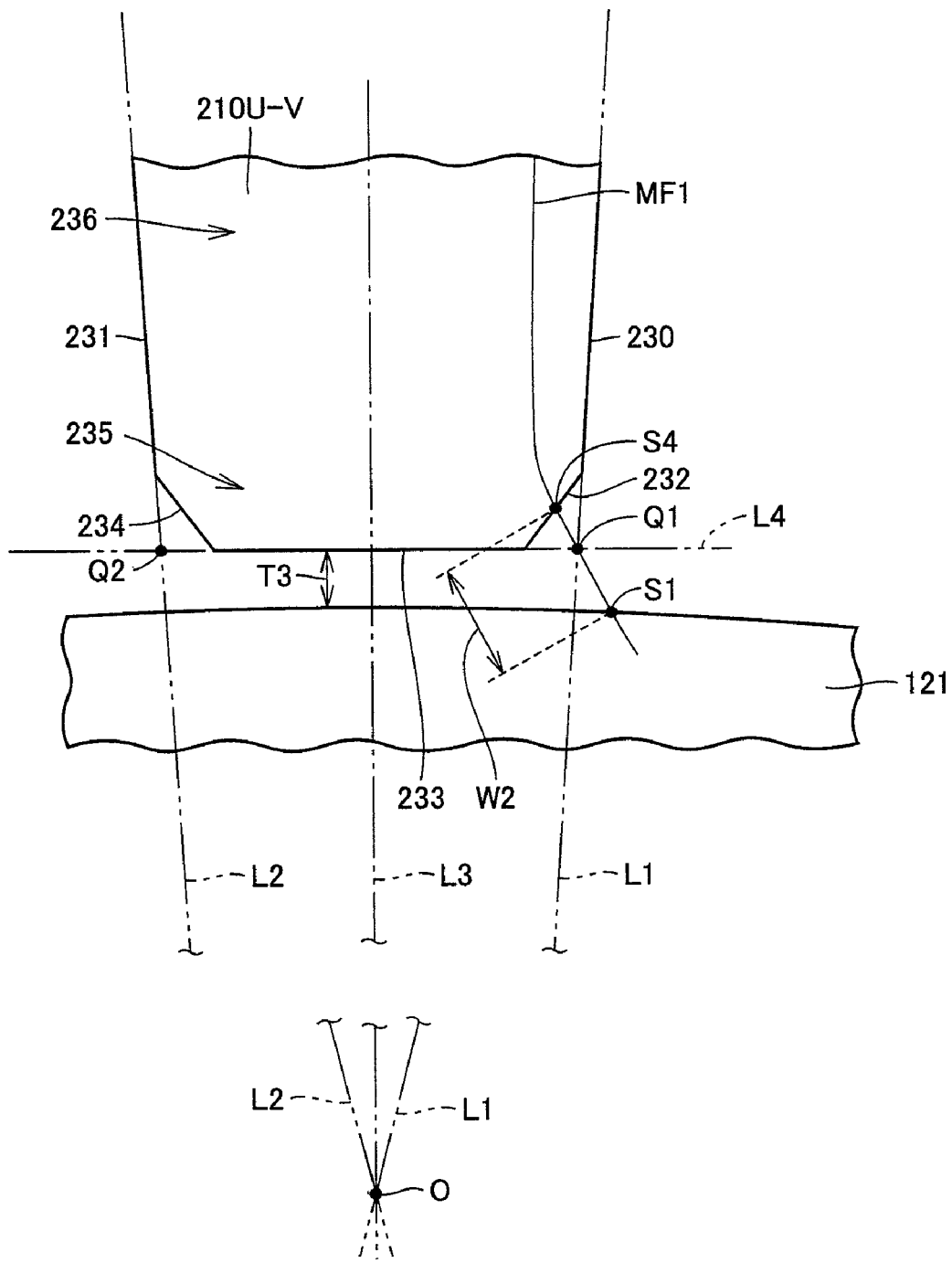
FIG. 16 is a plan view of an inter-hetero-phase tooth.
Figure 17:
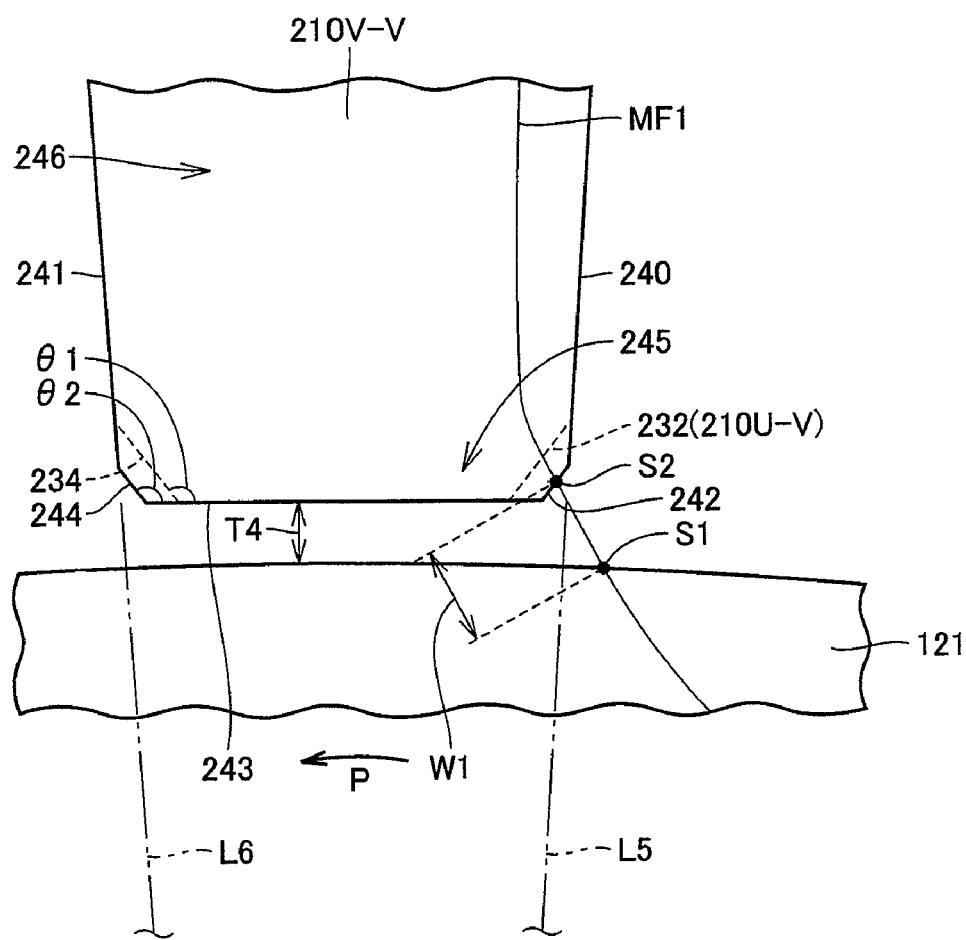
FIG. 17 is a plan view of an inter-V-phase tooth.

FIG. 16 is a plan view of an inter-hetero-phase tooth 210U-V, and FIG. 17 is a plan view of an inter-V-phase tooth 210V-V.

As shown in FIG. 16, along the surface of inter-hetero-phase tooth 210U-V, chamfers 232, 234 extending continuously from an inner end face 233 located on the radially inner side and sides 230, 231 laterally located in the circumferential direction are formed between inner end face 233 and sides 230, 231.

Chamfers 232, 234 extend away from the outer peripheral surface of rotor core 121, from inner end face 233 toward sides 230, 231.

As shown in FIG. 17, inter-V-phase tooth 210V-V includes a body 246 defined by sides 240, 241, and a head 245 extending continuously from body 246 and located radially inward with respect to body 246.

Head 245 includes an inner end face 243 located on the radially inner end, a chamfer 242 extending continuously from inner end face 243 and from side 240, and a chamfer 244 extending continuously from inner end face 243 and from side 241.

Chamfers 242, 244 also extend away from the outer peripheral surface of rotor core 121, from inner end face 243 toward sides 240, 241.

It is supposed here that an imaginary axis line extending along side 240 is imaginary side axis line L5, and an imaginary line extending along side 241 is imaginary side axis line L6, where inter-V-phase tooth 210V-V is seen from above in the direction of rotational central line O.

Chamfer 242 inclines such that chamfer 242 extends away from imaginary side axis line L5 while approaching imaginary side axis line L6, from side 240 toward inner end face 243. Chamfer 244 extends such that chamfer 244 extends away from imaginary side axis line L6 while approaching imaginary side axis line L5, from side 241 toward inner end face 243.

Where inter-hetero-phase tooth 210U-V and inter-V-phase tooth 210V-V are superposed on each other, sides 241, 240 of inter-V-phase tooth 210V-V and sides 231, 230 of inter-hetero-phase tooth 210U-V substantially coincide with each other, and inner end face 243 of inter-V-phase tooth 210V-V and inner end face 233 of inter-hetero-phase tooth 210U-V substantially coincide with each other.

Chamfer 232 of inter-hetero-phase tooth 210U-V is located further away from the outer peripheral surface of rotor core 121 as compared with chamfer 242 of inter-V-phase tooth 210V-V. Likewise, chamfer 234 of inter-hetero-phase tooth 210U-V is located further away from the outer peripheral surface of rotor core 121 as compared with chamfer 244 of inter-V-phase tooth 210V-V. Other inter-U-phase teeth 210U-U and inter-W-phase teeth 210W-W are formed similarly to inter-V-phase tooth 210V-V, and other inter-hetero-phase teeth 210W-U and inter-hetero-phase teeth 210V-W are formed similarly to inter-hetero-phase tooth 210U-V.

Accordingly, the reluctance of a magnetic circuit where a magnetic flux from permanent magnet 122 passes when the magnetic flux from permanent magnet 122 starts to proceed in inter-hetero-phase tooth, and the reluctance of the magnetic circuit where the magnetic flux from permanent magnet 122 passes when the magnetic flux from permanent magnet 122 starts to proceed in inter-homo-phase tooth are substantially identical to each other.

Thus, in the rotating electric machine of the second embodiment as well, vibrations and noise are suppressed like the rotating electric machine of the first embodiment.

In the rotating electric machine of the second embodiment, chamfers are formed not only on the head of the inter-hetero-phase tooth but also on the head of the inter-homo-phase tooth. Thus, when a plurality of split stator cores 250 are inserted from the outer peripheral surface of multiphase coil 132 as shown in FIG. 14, the surface of multiphase coil 132 can be prevented from being damaged by each stator tooth. Further, split stator cores 250 can be easily inserted in multiphase coil 132, and the assembly efficiency of the rotating electric machine can be improved.

In the example shown in FIG. 17, cross angle θ2 that is a smaller one of cross angles defined by chamfer 244 and inner end face 243 is made substantially equal to cross angle θ1 that is a smaller one of cross angles defined by chamfer 234 and inner end face 233. The relative magnitudes of the angles, however, are not limited to the above-described ones.

Preferably, cross angle θ2 is made larger than cross angle θ1. More preferably, the boundary between chamfer 244 and side 241 is positioned closer to inner end face 243 (inner end face 233) relative to the boundary between chamfer 234 and side 231. Chamfer 244 can thus be formed to allow chamfer 234 to be located further away from the outer peripheral surface of rotor core 121, relative to chamfer 244. Chamfer 242 is formed similarly to chamfer 244, and chamfer 232 is formed similarly to chamfer 234.

Figure 18:
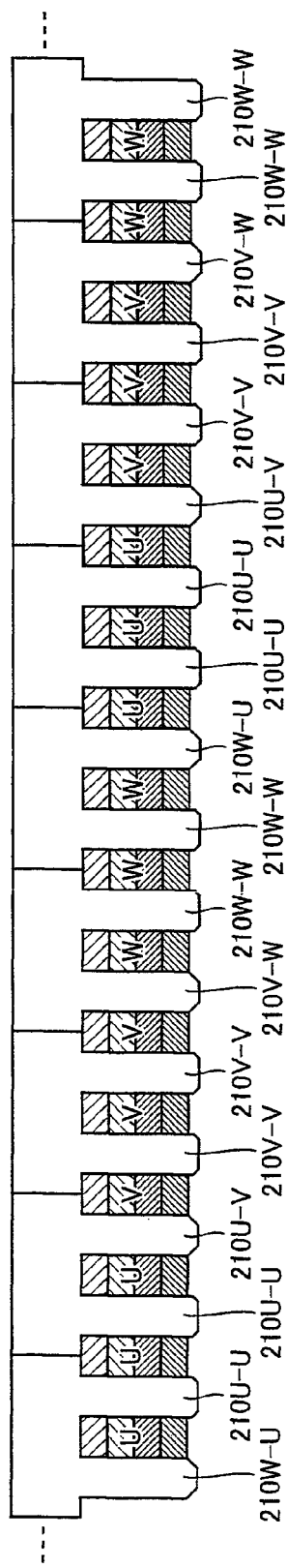
FIG. 18 is a developed view of a stator where the number of slots (s) among which a coil is distributed is three.

While the number of slots (s) among which the coil is distributed is two in the rotating electric machine described above with reference to the examples shown in FIGS. 15 to 17, the number of slots (s) may be three for example. FIG. 18 is a developed view of a stator 130 where the number of slots (s) among which a coil is distributed is three.

In the example shown in FIG. 18, three U phase slots 220U, three V phase slots 220V and three W phase slots 220W are arranged in order. Therefore, between inter-hetero-phase teeth, two inter-homo-phase teeth are located. Namely, the number of inter-homo-phase teeth located between the inter-hetero-phase teeth is ((the number of slots (s) among which the coil is distributed)−1).

The inter-hetero-phase teeth each have chamfers 232, 234 as formed and other inter-homo-phase teeth each also have chamfers 242, 244.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A rotating electric machine comprising:
   a stator having an annularly-shaped stator core and a multiphase coil attached to the stator core and including a plurality of phase coils supplied with alternating currents of different phases respectively; and
   a rotor inserted in said stator and having a plurality of magnetic poles,
   said stator core including a yoke extending in a circumferential direction of said stator core, a plurality of stator teeth formed on a peripheral surface of the yoke and spaced from each other in the circumferential direction, and a plurality of slots defined between said stator teeth, said phase coils being inserted in said slots,
   said stator teeth including an inter-homo-phase tooth laterally sandwiched between two said slots in which said phase coils of the same phase are inserted respectively, and an inter-hetero-phase tooth laterally sandwiched between two said slots in which said phase coils of different phases are inserted respectively, and
   a magnetic flux path length between said rotor and said inter-hetero-phase tooth where a magnetic flux from said magnetic pole proceeds from said rotor and starts to enter said inter-hetero-phase tooth being longer than a magnetic flux path length between said rotor and said inter-homo-phase tooth where said magnetic flux proceeds from said rotor and starts to enter said inter-homo-phase tooth,
   wherein:
      said inter-hetero-phase tooth includes an inter-hetero-phase tooth body defined by a pair of sides located laterally in the circumferential direction of said stator core, and an inter-hetero-phase tooth head located radially inward of said stator core with respect to said inter-hetero-phase tooth body and extending continuously from said inter-hetero-phase tooth body, and
      said inter-hetero-phase tooth head includes at least one of a first receding portion extending continuously from one side of said pair of sides of said inter-hetero-phase tooth body and, toward radially inner side, extending away from a first imaginary side axis line and approaching a second imaginary side axis line, and a second receding portion extending continuously from the other side of said pair of sides of said inter-hetero-phase tooth body and, toward radially inner side, extending away from said second imaginary side axis line and approaching said first imaginary side axis line,
      where said first imaginary side axis line is an imaginary axis line extending along the one side of said pair of sides of said inter-hetero-phase tooth, and
      where said second imaginary side axis line is an imaginary axis line extending along the other side of said pair of sides of said inter-hetero-phase tooth.

2. The rotating electric machine according to claim 1, wherein
   said inter-hetero-phase tooth includes said first receding portion and said second receding portion,
   said inter-homo-phase tooth includes an inter-homo-phase tooth body defined by a pair of sides located laterally in the circumferential direction of said stator core, and an inter-homo-phase tooth head located radially inward of said stator core with respect to said inter-homo-phase tooth body and extending continuously from said inter-homo-phase tooth body,
   said inter-homo-phase tooth head includes a third receding portion extending continuously from one side of said pair of sides of said inter-homo-phase tooth body and, toward radially inner side, extending away from a third imaginary side axis line and approaching a fourth imaginary side axis line, and a fourth receding portion extending continuously from the other side of said pair of sides of said inter-homo-phase tooth body and, toward radially inner side, extending away from said fourth imaginary side axis line and approaching said third imaginary side axis line,
   where said third imaginary side axis line is an imaginary axis line extending along the one side of said pair of sides of said inter-homo-phase tooth, and
   where said fourth imaginary side axis line is an imaginary axis line extending along the other side of said pair of sides of said inter-homo-phase tooth, and
   said first receding portion is located radially outward with respect to said third receding portion, and said second receding portion is located radially outward with respect to said fourth receding portion.

3. The rotating electric machine according to claim 2, wherein
   said inter-hetero-phase tooth includes a first end face located radially inward of said inter-hetero-phase tooth head,
   said inter-homo-phase tooth includes a second end face located radially inward of said inter-homo-phase tooth head,
   a smaller one of cross angles defined by said first end face and said first receding portion is smaller than a smaller one of cross angles defined by said second end face and said third receding portion, and
   a smaller one of cross angles defined by said first end face and said second receding portion is smaller than a smaller one of cross angles defined by said second end face and said fourth receding portion.

4. The rotating electric machine according to claim 1, wherein
   said stator teeth are tapered from a bottom on said yoke side toward an end face located radially inward.

5. The rotating electric machine according to claim 1, wherein
   said multiphase coil is s-slot distributed coil distributed among s (s is a positive number) slots, and the number of said inter-homo-phase teeth located between said inter-hetero-phase teeth is (s−1).

6. A rotating electric machine comprising:

a stator having an annularly-shaped stator core and a multiphase coil attached to the stator core and including a plurality of phase coils supplied with alternating currents of different phases respectively; and a rotor inserted in said stator and having a plurality of magnetic poles, said stator core including a yoke extending in a circumferential direction of said stator core, a plurality of stator teeth formed on a peripheral surface of the yoke and spaced from each other in the circumferential direction, and a plurality of slots defined between said stator teeth, said phase coils being inserted in said slots, said stator teeth including an inter-homo-phase tooth laterally sandwiched between two said slots in which said phase coils of the same phase are inserted respectively, and an inter-hetero-phase tooth laterally sandwiched between two said slots in which said phase coils of different phases are inserted respectively, and a magnetic flux path length between said rotor and said inter-hetero-phase tooth where a magnetic flux from said magnetic pole proceeds from said rotor and starts to enter said inter-hetero-phase tooth being longer than a magnetic flux path length between said rotor and said inter-homo-phase tooth where said magnetic flux proceeds from said rotor and starts to enter said inter-homo-phase tooth, wherein:

said inter-hetero-phase tooth includes a body defined by a pair of sides located laterally in the circumferential direction of said stator core, and a head located radially inward of said stator core with respect to said body and extending continuously from said body, and said head is located on an imaginary radial axis line side relative to an imaginary intersection of an imaginary side axis line and an imaginary end face axis line, where said imaginary side axis line is an imaginary axis line extending along one side of said pair of sides of said inter-hetero-phase tooth, where said imaginary radial axis line is an imaginary axis line crossing an end face located radially inward of said inter-hetero-phase tooth and extending in radial direction of said stator, and where said imaginary end face axis line is an imaginary axis line extending along said end face and extending perpendicularly to said imaginary radial axis line.

7. A rotating electric machine comprising:

a stator having an annularly-shaped stator core and a multiphase coil attached to the stator core and including a plurality of phase coils supplied with alternating currents of different phases respectively; and a rotor inserted in said stator and having a plurality of magnetic poles, said stator core including a yoke extending in a circumferential direction of said stator core, a plurality of stator teeth formed on a peripheral surface of the yoke and spaced from each other in the circumferential direction, and a plurality of slots defined between said stator teeth, said phase coils being inserted in said slots, said stator teeth including an inter-homo-phase tooth laterally sandwiched between two said slots in which said phase coils of the same phase are inserted respectively, and an inter-hetero-phase tooth laterally sandwiched between two said slots in which said phase coils of different phases are inserted respectively, and a magnetic flux path length between said rotor and said inter-hetero-phase tooth where a magnetic flux from said magnetic pole proceeds from said rotor and starts to enter said inter-hetero-phase tooth being longer than a magnetic flux path length between said rotor and said inter-homo-phase tooth where said magnetic flux proceeds from said rotor and starts to enter said inter-homo-phase tooth, wherein respective corners between an end face located radially inward of said inter-hetero-phase tooth and respective sides of said inter-hetero-phase tooth that are located laterally in the circumferential direction of said stator core are located further away from said rotor relative to respective corners between an end face located radially inward of said inter-homo-phase tooth and respective sides of said inter-homo-phase tooth that are located laterally in the circumferential direction of said stator core.

\* \* \* \* \*